United States Patent
Fox

(10) Patent No.: US 9,360,345 B2
(45) Date of Patent: Jun. 7, 2016

(54) EXTENDED SMART POSITION SENSING RANGE USING ELECTROMAGNETICS

(71) Applicant: Honeywell International, Inc., Morristown, NJ (US)

(72) Inventor: Joshua Fox, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 718 days.

(21) Appl. No.: 13/648,844

(22) Filed: Oct. 10, 2012

(65) Prior Publication Data

US 2013/0088219 A1    Apr. 11, 2013

Related U.S. Application Data

(60) Provisional application No. 61/545,482, filed on Oct. 10, 2011.

(51) Int. Cl.
| | |
|---|---|
| *G01B 7/14* | (2006.01) |
| *G01R 33/09* | (2006.01) |
| *G01D 5/14* | (2006.01) |
| *G01B 7/00* | (2006.01) |
| *G01B 7/004* | (2006.01) |

(52) U.S. Cl.
CPC .............. *G01D 5/145* (2013.01); *G01B 7/003* (2013.01); *G01B 7/004* (2013.01)

(58) Field of Classification Search
CPC .... G01R 33/093; G01R 33/09; G01R 33/098; G01D 5/145; G01B 7/003
USPC ....................................... 324/207.24, 207.11
See application file for complete search history.

(56) References Cited

U.S. PATENT DOCUMENTS

| | | | |
|---|---|---|---|
| 4,810,965 A | 3/1989 | Fujiwara et al. |
| 5,304,926 A | 4/1994 | Wu |
| 5,351,003 A | 9/1994 | Bauer et al. |
| 5,589,769 A | 12/1996 | Krahn |
| 5,666,050 A | 9/1997 | Bouldin et al. |
| 5,667,879 A | 9/1997 | Haji-Sheikh |
| 6,097,183 A | 8/2000 | Goetz et al. |
| 6,509,732 B1 | 1/2003 | Rhodes et al. |
| 6,784,659 B2 | 8/2004 | Haji-Sheikh et al. |
| 7,030,604 B1 | 4/2006 | Dmytriw et al. |
| 7,049,914 B2 | 5/2006 | Lamb et al. |
| 7,112,962 B2 | 9/2006 | Ricks et al. |
| 7,135,857 B2 | 11/2006 | Johnson |
| 7,145,326 B2 | 12/2006 | Rhodes et al. |
| 7,173,414 B2 | 2/2007 | Ricks et al. |
| 7,208,940 B2 | 4/2007 | Withanawasam et al. |
| 7,271,586 B2 | 9/2007 | Bohlinger et al. |
| 7,355,389 B2 | 4/2008 | Rieger et al. |

(Continued)

FOREIGN PATENT DOCUMENTS

CA         2351525       4/2006

*Primary Examiner* — Reena Aurora
(74) *Attorney, Agent, or Firm* — Conley Rose, P.C.; Kristin Jordan Harkins

(57) ABSTRACT

A system having a sensor using one or more magnetic field detectors to determine its position on a path of travel relative to one or more magnets situated on the path. The magnets may be electromagnets arranged in regions along the path with a region between two electromagnets. One or more electromagnets may be selectively activated so as to define a region where the sensor is present. An indication from the system may provide a position of the sensor within a region and identify the region where the sensor is situated.

15 Claims, 7 Drawing Sheets

(56) References Cited

U.S. PATENT DOCUMENTS

| | | |
|---|---|---|
| 7,408,343 B2 | 8/2008 | Dmytriw et al. |
| 7,420,365 B2 | 9/2008 | Witcraft et al. |
| 7,772,835 B2 | 8/2010 | Dmytriw et al. |
| 7,812,596 B2 | 10/2010 | Potter et al. |
| 7,830,495 B2 | 11/2010 | Van Bruggen et al. |
| 7,859,253 B2 * | 12/2010 | Manco et al. ............ 324/207.25 |
| 7,926,193 B2 | 4/2011 | Peczalski |
| 8,004,277 B2 | 8/2011 | Patil et al. |
| 8,018,223 B2 | 9/2011 | Latoria et al. |
| 8,125,217 B2 | 2/2012 | Dmytriw et al. |
| 2006/0103373 A1 | 5/2006 | Ricks et al. |
| 2007/0052077 A1 | 3/2007 | Wathanawasam et al. |
| 2009/0045979 A1 | 2/2009 | Potter et al. |
| 2009/0256553 A1 | 10/2009 | Dmytriw et al. |
| 2010/0223797 A1 | 9/2010 | Peczalski |
| 2011/0127994 A1 | 6/2011 | Dmytriw et al. |

\* cited by examiner

EXTENDED SMART POSITION SENSING RANGE USING ELECTROMAGNETICS

This application claims the benefit of U.S. Provisional Application No. 61/545,482, filed Oct. 10, 2011, and entitled "Extending Smart Position Sensing Range Using Electromagnetics". U.S. Provisional Application No. 61/545,482, filed Oct. 10, 2011, is hereby incorporated by reference.

BACKGROUND

The present disclosure pertains to position detectors and particularly to magnetic position detectors.

SUMMARY

The disclosure reveals a system having a sensor using one or more magnetic field detectors to determine its position on a path of travel relative to one or more magnets situated on the path. The magnets may be electromagnets arranged according to regions along the path with a region between two electromagnets. One or more electromagnets may be selectively activated so as to define a region where the sensor is present. An indication from the system may provide a position of the sensor within a region and identify the region where the sensor is situated.

DESCRIPTION

The present disclosure reveals a system using an array of electromagnetics as targets for a smart position sensor (SPS).

A smart position sensor might be a position sensor made up of a magnet target and an array of anisotropic magnetoresistive (AMR) sensors in a desired sensing geometry, including linear, arc, and rotary geometrics. Differential outputs of the AMR sensors may be read by an ASIC (application specific integrated circuit) that uses an algorithm to convert AMR responses to a linear output.

The AMR SPS may be limited in sensing range by the magnet dimensions and the number of AMRs that can be used in an array. A typical magnet is normally smaller than 26×20× 20 mm. In order to increase the sensing range with a fixed number of AMRs, the designer may have to increase the magnet dimensions. With increased dimensions, the cost and size of the sensor may become unpractical. The number of AMRs may be increased to achieve more sensing span. However, the SPS system may be constrained to 32 AMRs in an array. If the bridge to bridge spacing is 10 mm, then a designer may be constrained to a sensing span of 310 mm. The same design factors may apply to wide diameter arc and rotary span sensors. The AMR sensors may use rare earth magnets as targets. Such magnets are not necessarily inexpensive.

Instances of magnetic sensors and processing of their signals may be disclosed in the following noted patent documents. U.S. Pat. No. 5,589,769, issued Dec. 31, 1996, and entitled "Position Detection Apparatus Including a Circuit for Receiving a Plurality of Output Signal Values and Fitting the Output Signal Values to a Curve", is hereby incorporated by reference. U.S. Pat. No. 6,097,183, issued Aug. 1, 2000, and entitled "Position Detection Apparatus with Correction for Non-Linear Sensor Regions", is hereby incorporated by reference. U.S. Pat. No. 7,173,414, issued Feb. 6, 2007, and entitled "Position Detection Apparatus and Method for Linear and Rotary Sensing Application", is hereby incorporated by reference.

The present system may, as a solution to reducing costs, increase range and advantageous performance. The present system may use an array of electromagnets, such as iron-cored solenoids. The solenoids may be setup in an array along the sensor's path of travel (e.g., a linear array).

The present system and approach, as described herein and/ or shown in the Figures, may incorporate one or more processors, computers, controllers, user interfaces, wireless and/ or wire connections, and/or the like, wherever desired.

Figure 1:
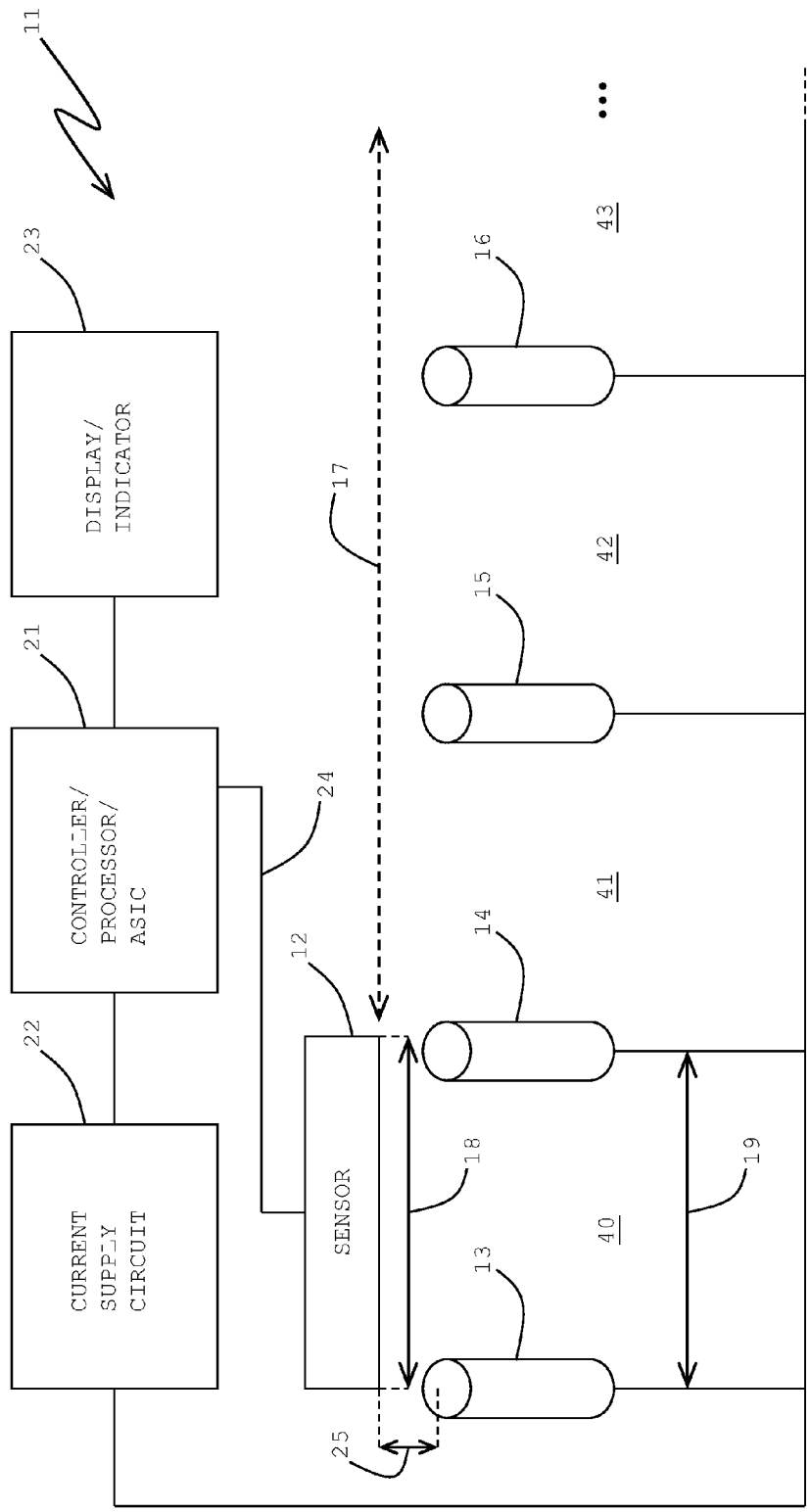
FIG. 1 is a diagram of a position sensor system having electromagnetic solenoids.

FIG. 1 is a diagram of a position sensing system 11. There may be a sensor 12 and solenoids 13, 14, 15 and 16. The solenoids may be electromagnets having a coil with a magnetic sensitive metallic core or no core, along a path 17 with one or more directions of travel. There may be more or less than the four solenoids shown in system 11. Path 17 may be linear or non-linear, or a combination of linear and non-linear. For instance, the path may be a straight line, an ellipse, various arcs of a circle, a full circle, some sort of a curve, and other kinds of paths. Solenoids 13, 14, 15 and 16 may be equally spaced at a distance 19 on path 17 but be slightly shorter than the sensing span 18 of sensor 12. The solenoids may in some arrangements be unequally spaced.

For an example of dimensions, sensor 12 may be 200 mm long in its direction of travel, while the solenoids may be spaced 198 mm apart (i.e., about 1 percent shorter). Each solenoid may represent a region between it and another solenoid. System 11 may have one or more regions.

System 11 may have a microcontroller, an ASIC (application-specific integrated circuit) or processor 21 connected via a line 24 to sensor 12 to read the sensor and provide signals to control current circuit 22 for controlling current to the solenoids. Line 24 may be a wire or wireless connection. For instance, current may be fed to the solenoid of the region in which sensor 12 is situated. Circuit 22 may be connected to solenoids 13, 14, 15 and 16. Circuit 22 may connect to additional solenoids as desired. A display/indicator 23 may be connected to processor 21 for providing information about the position of sensor 12 relative to its position within a region and which region where sensor 12 is situated. Processor 21 may have a memory or storage for containing data, algorithms, programs, operating systems, and so forth.

The present sensor system 11 in FIG. 1 may be regarded, as an illustrative example, to have, for example, at least four regions 40, 41, 42 and 43 of 198 mm each. If an output of 20 mm is a measure taken in region 41, then the sensor position may be 218 mm (i.e., 198 mm plus 20 mm). A microcontroller may keep track of the measurements. With this data, the present system may determine in which region that the sensor is situated.

Figure 2:
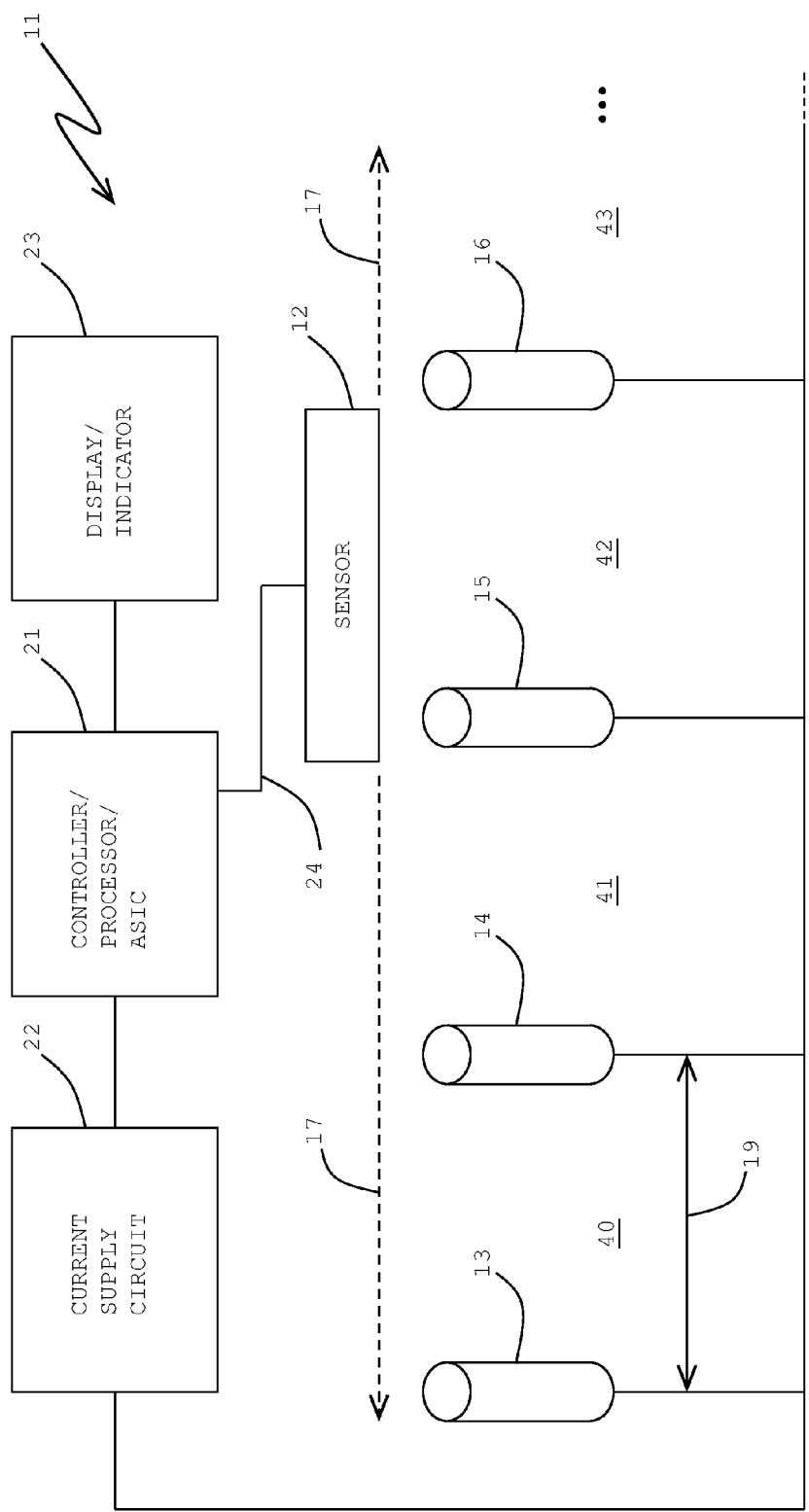
FIG. 2 is a diagram like that of FIG. 1 except with the sensor of the system in a different position on a path.

FIG. 2 is a diagram showing another position of sensor 12 relative to the position of the sensor in FIG. 1.

Figure 3:
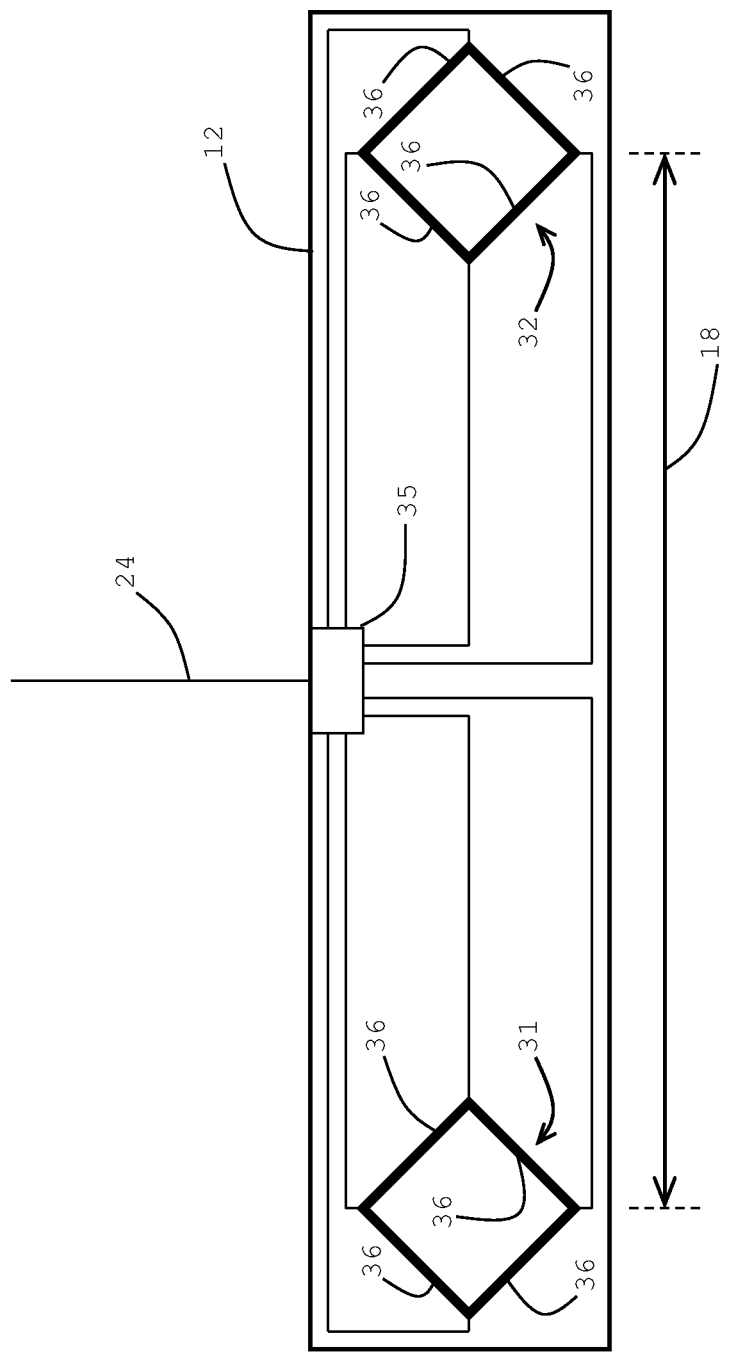
FIG. 3 is a diagram of an example circuitry of the position sensor.
Figure 4:
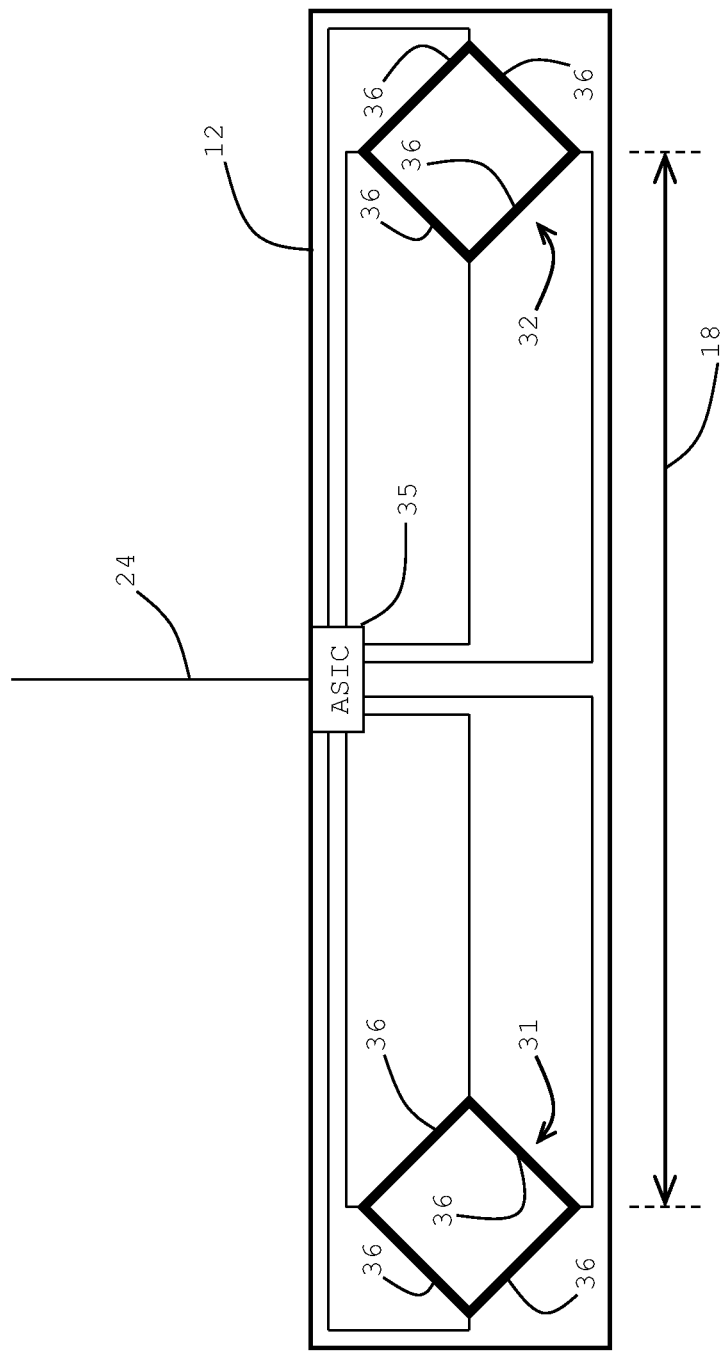
FIG. 4 is a diagram of the position sensor incorporating an ASIC.
Figure 5:
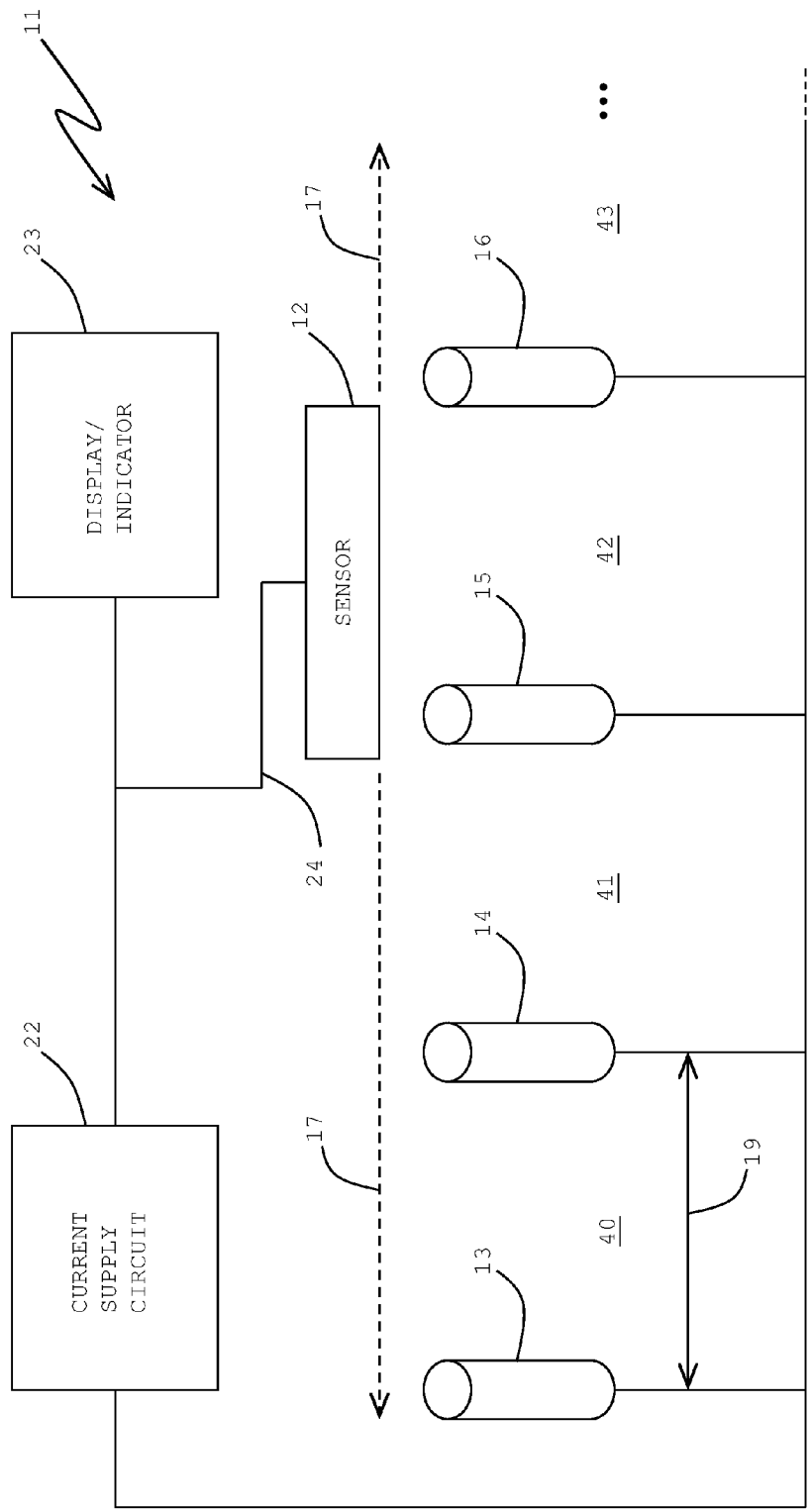
FIG. 5 is a diagram of the position sensor system incorporating an ASIC or microcontroller within the sensor.

FIG. 3 is a diagram of sensor 12 which have may have one or more MR sensing devices. The sensing device may be of another magnetic sensing technology and/or configuration. A present instance of sensor 12 may have two sensing bridges 31 and 32. There may be more or less than two sensing bridges. Interface electronics 35 may be connected to the bridges 31 and 32, and processor 21. Interface electronics 35 may in some instances incorporate or be processor 21. Processor 21 may be an ASIC as shown in FIG. 4. The ASIC, controller or processor 21 in sensor 12, as shown as interface electronics 35 in FIG. 4 and with an absence of processor 21 external to sensor 12 in FIG. 5, may operate in lieu of a controller or processor 21 situated outside of sensor 12, as shown in FIGS. 1 and 2. The ASIC may provide signals to current supply circuit 22 for magnet selection in activation of electromagnets 40, 41, 42, 43, and so on. Also, the ASIC may provide signals to display/indicator 23 to provide a visual or electronic indication of the position of sensor 12. Interface electronics 35 may instead be a microcontroller or some other miniature processing mechanism.

MR bridges 31 and 32 may be biased in a saturation mode and thus provide large signals that require very little amplification. MR bridge output signals may be virtually unaffected by static or dynamic changes in an airgap 25 between the bridge and a magnet upon which a sensed position is based (FIG. 1). Maximum air gap may be a function of magnet size and strength. Airgaps of 20 mm may be easily attained.

An illustrative example of a bridge, such as bridge 31 or 32, may contain four permalloy or anisotropic magnetoresistive strips 36 connected in a bridge connection arrangement. They may operate in a magnetic field strong enough to saturate the strips. A resistance change of the strips may be a measure of an angle of the magnetic field. A magnetic sensor 12 may have one, two, three or more bridges, like that of bridge 31 or 32.

The present magnetic sensor may be utilized as an instrument for measuring elevator position, valve position, linear position, rotary position, combination linear and rotary position, boom angle, steering angle, lift angle, outrigger position on, various kinds of equipment, systems, and so on.

Upon system start up, sensor 12 may begin to look for a valid pair of bridges. At this point, the system may start energizing the electromagnets individually. After each electromagnet is energized, a measurement from the sensor may be taken. If there is a valid output from the sensor, then the system may know that the sensor is in a region of the energized electromagnet. The output of the sensor may then simply be added to the position of the region.

The present magnetic sensor system 11 may be utilized in environments having temperatures up to and exceeding 200 degrees Centigrade. Temperature limitations may be due to packaging aspects of the sensor system and not necessarily due to the magnetic sensor itself.

Figure 6:
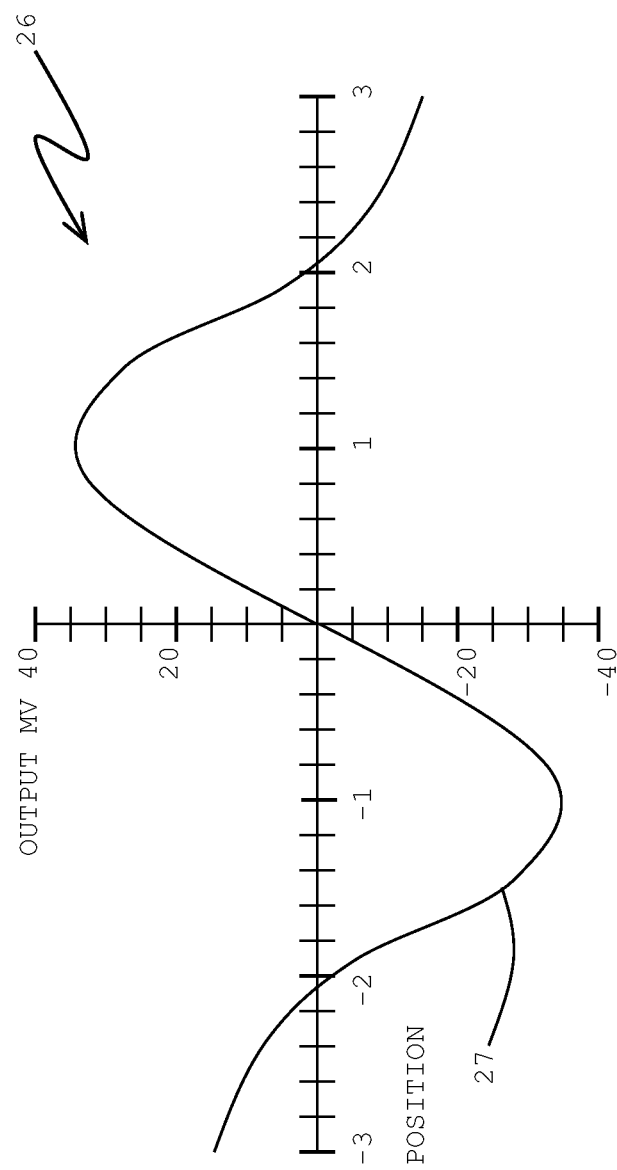
FIG. 6 is a diagram of a signature from a position sensor as it passes by a magnet.
Figure 7:
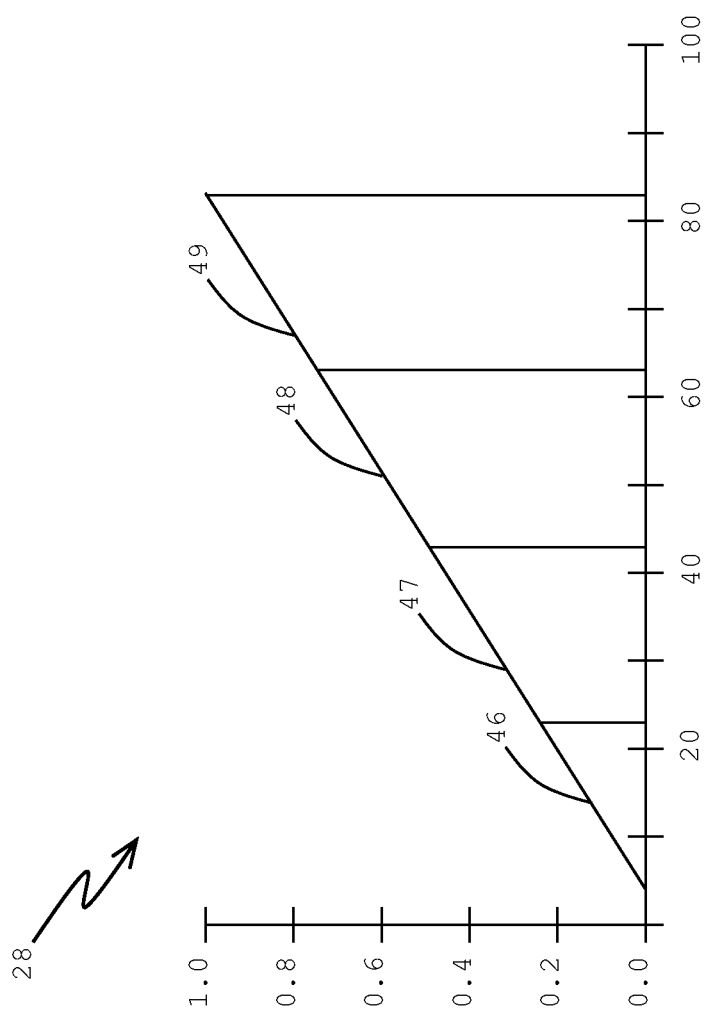
FIG. 7 is a diagram of individual signatures transformed into a linear response for a sequence of regions.

FIG. 6 is a diagram of a graph 26, with sensor 12 position versus output, of how a bridge 31 or 32 in terms of an individual non-linear signature 27, may see a magnet as it passes by the magnet. FIG. 7 is a diagram of a graph 28 of individual signatures, like the one in graph 26, being transformed into a linear response 46 for a first region 40, a response 47 for region 41, a response 48 for region 42, and a response 49 for region 43 of FIG. 1.

Processing signals from sensor bridges 31 and 32 may be provided by an algorithm, steps of calculation, or other formulation, enacted with software, firmware or the like in the processor, ASIC or controller 21, or an ASIC or microcontroller of interface electronics 35 of sensor 12. Processing may be of signals from sensor 12 which could resemble that of FIG. 6 and provided into a format of signals like that of FIG. 7. Whatever approach is utilized in the processing of the signals from sensor 12 and providing the signals to current supply circuit 22, a result provided to display/indicator 23 may identify the region where sensor 12 is located and the position of accuracy of sensor 12 within the identified region. The result may be represented as a digital or analog output. The position of accuracy of sensor 12 along path 17 may vary from within one micron to greater than a micron, depending on the quality, sophistication and preciseness of the components and processing attributes (e.g., algorithm) of position sensor system 11. Costs may be inversely proportional to position accuracy of sensor 12 along path 17, that is, a smaller tolerance of error in sensor position, the greater the cost of system 11.

To recap, a position sensor may incorporate one or more electromagnets situated along a path, a magnetic sensor moveable along the path, and a processor connected to the magnetic sensor. The magnetic sensor may convert a detected magnetic field into an electrical signal. A region may be between a pair of electromagnets situated along the path. One or more of the pair of electromagnets may be selectively energized to provide a magnetic field in the region. An indication of a position of the magnetic sensor on the path may incorporate a region that the magnetic sensor is in, and a position of the magnetic sensor within the region.

The magnetic sensor may incorporate the processor. The processor may be selected from a group consisting of an application specific integrated circuit, a microcontroller and a miniature processor.

The one or more electromagnets may be energized to contain the magnetic sensor in a region as the magnetic sensor moves along the path.

The position sensor may further incorporate a current supply circuit connected to the processor. The one or more electromagnets may be connected to the current supply circuit. Each of the one or more electromagnets may be selectively energized by current from the current supply circuit according to a signal from the processor.

The magnetic sensor may incorporate at least one bridge circuit having elements sensitive to the magnetic field. The elements may be connected end-to-end in a configuration of a bridge circuit. One or more ends of the bridge circuit may provide the electrical signals that are converted by the processor into the indication of the position of the magnetic sensor on the path within the region that the magnetic sensor is situated. The elements may be anisotropic magnetoresistive elements. If the electrical signals are a non-linear indication of a position of the magnetic sensor, then the processor with an algorithm may convert the non-linear signals into linear signals indicating the position of the magnetic sensor along the path, whether the path is linear or non-linear.

The path may have a configuration selected from a group consisting of a straight line, a circle, an ellipse, an arc of a circle, a curve, and a combination of linear and non-linear geometrical lines.

An approach for finding a position, may incorporate providing one or more magnets along a path, situating a magnetic sensor along the path, connecting a processor to the magnetic sensor, detecting a magnetic field of a magnet with the magnetic sensor, and converting the magnetic field of the magnet into an electrical signal indicative of a position of the magnetic sensor within a region. A region may be a portion of the path between two magnets. Each of the one or more magnets may be an electromagnet, and each of the electromagnets may be selectively energized to provide a magnetic field in a region where the magnetic sensor is situated.

The approach may further incorporate a current supply circuit connected to the processor. One or more electromagnets may be selectively energized by current from the current supply circuit according to a signal from the processor.

The magnetic sensor may incorporate at least one bridge circuit having elements sensitive to the magnetic field. The elements may be permalloy elements. The elements may be connected end to end to form a bridge circuit. One or more ends of the bridge circuit may provide the electrical signals that are converted by the processor into an indication of the position of the magnetic sensor on the path within a region.

The processor may be incorporated within a structure containing the magnetic sensor. If the electrical signals are a non-linear indication of the position of the magnetic sensor, then the processor with an algorithm may convert the non-linear signals into linear signals indicating a position of the magnetic sensor along the path, whether the path is linear or non-linear.

A position finding system may incorporate one or more magnets situated along a path, a magnetic sensor moveable along the path, and a processor connected to the magnetic sensor. The magnetic sensor may convert a detected magnetic field of a magnet into an electrical signal indicative of a position within a region of the magnetic sensor. A region may be between two magnets situated along the path. The region where the magnetic sensor is situated may be indicated by the processor.

The position finding system may further incorporate a current supply circuit connected to the processor. One or more magnets may be electromagnets. The one or more electromagnets may be connected to the current supply circuit. One or more electromagnets may be selectively energized by current from the current supply circuit according to a signal from the processor that determines the region where the magnetic sensor is situated.

The magnetic sensor may incorporate at least one bridge circuit having elements sensitive to a magnetic field. The elements may be connected end-to-end to form a bridge circuit. One or more ends of the bridge circuit may provide electrical signals that are converted by the processor into an indication of the position of the magnetic sensor on the path within a region.

If the electrical signals are a non-linear indication of the position of the magnetic sensor, then the processor with an algorithm may convert the non-linear signals into linear signals indicating a position of the magnetic sensor within a region along the path, whether the path is linear or non-linear.

An electromagnet may be a solenoid having a core of a magnetic sensitive material. The processor may be an application specific integrated circuit situated within a structure incorporating the magnetic sensor.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A position sensor comprising:
a plurality of electromagnets situated along a path;
a magnetic sensor moveable along the path; and
a processor connected to the magnetic sensor; and
wherein:
the magnetic sensor converts a detected magnetic field into an electrical signal;
a region is between a pair of electromagnets situated along the path;
the processor individually energizes each of the pair of electromagnets to provide a magnetic field in the region; and
the processor generates an indication of a position of the magnetic sensor on the path based on both the electrical signal from the magnetic sensor and which of the electromagnets the processor energized while the magnetic sensor converted the magnetic field into the electrical signal, and
the indication comprises both a region that the magnetic sensor is in, and a position of the magnetic sensor within the region.

2. The position sensor of claim 1, wherein:
the magnetic sensor incorporates the processor; and
the processor is selected from a group consisting of an application specific integrated circuit, a microcontroller and a miniature processor.

3. The position sensor of claim 1, wherein the one or more electromagnets are energized to contain the magnetic sensor in a region as the magnetic sensor moves along the path.

4. The position sensor of claim 3, wherein if the electrical signals are a non-linear indication of a position of the magnetic sensor, then the processor with an algorithm converts the non-linear signals into linear signals indicating the position of the magnetic sensor along the path, whether the path is linear or non-linear.

5. The position sensor of claim 1, further comprising:
a current supply circuit connected to the processor; and
wherein:
the one or more electromagnets are connected to the current supply circuit; and
each of the one or more electromagnets is selectively energized by current from the current supply circuit according to a signal from the processor.

6. The position sensor of claim 5, wherein the magnetic sensor comprises at least one bridge circuit having elements sensitive to the magnetic field.

7. The position sensor of claim 6, wherein:
the elements are connected end-to-end in a configuration of a bridge circuit; and
one or more ends of the bridge circuit provide the electrical signals that are converted by the processor into the indication of the position of the magnetic sensor on the path within the region that the magnetic sensor is situated.

8. The position sensor of claim 7, wherein the elements are anisotropic magnetoresistive elements.

9. The position sensor of claim 1, wherein the path has a configuration selected from a group consisting of a straight line, a circle, an ellipse, an arc of a circle, a curve, and a combination of linear and non-linear geometrical lines.

10. A method for finding a position, comprising:
providing one or more electromagnets along a path;
situating a magnetic sensor along the path;
connecting a processor to the magnetic sensor;
individually energizing the electromagnets to provide a magnetic field in a region about the energized electromagnet;
detecting a magnetic field of an energized electromagnet with the magnetic sensor; and
converting the detected magnetic field of the energized electromagnet into an electrical signal indicative of a position of the magnetic sensor within the region; and wherein a region is a portion of the path between two electromagnets.

11. The method of claim 10, further comprising:
a current supply circuit connected to the processor; and
wherein one or more electromagnets are individually energized by current from the current supply circuit according to a signal from the processor.

12. The method of claim 10, wherein:
the magnetic sensor comprises at least one bridge circuit having elements sensitive to the magnetic field; and
the elements are permalloy elements.

13. The method of claim 12, wherein:
the elements are connected end to end to form a bridge circuit; and
one or more ends of the bridge circuit provide the electrical signals that are converted by the processor into an indication of the position of the magnetic sensor on the path within a region; and
wherein the processor is incorporated within a structure containing the magnetic sensor.

14. The method of claim 12, wherein if the electrical signals are a non-linear indication of the position of the magnetic sensor, then the processor with an algorithm converts the non-linear signals into linear signals indicating a position of the magnetic sensor along the path, whether the path is linear or non-linear.

15. The method of claim 10, wherein the one or more electromagnets define at least two regions, and the method further comprising identifying in which of the at least two regions the magnetic sensor is situated.

* * * * *